United States Patent [19]

Hotchkiss et al.

[11] 3,836,826
[45] Sept. 17, 1974

[54] COVERS FOR TERMINAL BOXES

[75] Inventors: Kenneth W. Hotchkiss, Blue Mountain; Gerald S. Byers, Coal Creek Canyon, both of Colo.

[73] Assignee: Photo Production Plastics, Inc., Boulder, Colo.

[22] Filed: May 18, 1973

[21] Appl. No.: 361,590

[52] U.S. Cl.............. 317/122, 174/72 A, 339/198 J
[51] Int. Cl............................................ H01r 13/44
[58] Field of Search.............. 174/72 A, 101, 138 F; 339/198 J, 198 R, 198 E, 36; 317/122, 118; 179/98

[56] References Cited
UNITED STATES PATENTS

| | | | |
|---|---|---|---|
| 3,485,937 | 12/1969 | Caveney | 174/101 |
| 3,560,632 | 2/1971 | Wallace | 339/36 X |
| 3,573,373 | 4/1971 | Mullin et al. | 174/72 A X |

*Primary Examiner*—J. V. Truhe
*Assistant Examiner*—David A. Tone
*Attorney, Agent, or Firm*—Bertha L. MacGregor

[57] ABSTRACT

Covers for terminal boxes generally rectangular in shape used in telephone installation equipment, said covers being made of transparent plastic material, each comprising a flat top for contacting and covering the open face of a terminal box, integral side walls provided with inwardly projecting means for engaging outwardly extending side wall members on said terminal box, and means preventing longitudinal sliding movement of the cover relatively to the terminal box. Said sliding movement preventing means may be and extensions at opposite ends of the cover top at right angles thereto partially closing said box ends and also serving to prevent foreign matter from falling into the box, or may be a rib on the inner surface of the top extending onto the inner surface of the cover side wall for entering spaces between the side wall members of the terminal box. The cover occupies limited space sidewise of the terminal box and thus permits the covered boxes to be mounted adjacent each other on a wall or support with little space between them for manipulation of the covers.

4 Claims, 9 Drawing Figures

PATENTED SEP 17 1974

COVERS FOR TERMINAL BOXES

This invention relates to covers for terminal boxes used in telephone installation equipment.

Heretofore such terminal boxes have been covered by metal covers nailed near their edges to the wall or other support on which the terminal boxes were mounted. The covers thus occupy space adjacent the sides, top and bottom of each terminal box and prevent positioning of the boxes closely adjacent each other as is desirable when a plurality of boxes are mounted on limited wall areas.

The metal covers of the prior art are also objectionable because they are not transparent. It is customary for telephone equipment installers to mark parts of terminal boxes for the purpose of identifying connectors and other components that are mounted in such boxes. Therefore it has been necessary to remove the metal covers when inspection of the markings was required.

The foregoing and other objections have been overcome by the covers of our invention which are transparent, preferably made of plastic material, and constructed to snap on and cover the open faces of terminal boxes without any fastening means, and without occupying space adjacent the boxes.

The main object of our invention is to provide covers simple in construction, transparent, easily mountable on the open faces of conventional terminal boxes to protect the boxes and connectors therein, to prevent foreign matter from falling into the box interiors, to prevent short circuiting, to prevent sliding movement of the covers relatively to the boxes on which they are mounted by simple snap action, and to make markings on the boxes visible for examination without removal of the covers.

In the drawings:

FIG. 1 is a front view of a terminal box such as is used in telephone installation equipment, provided with a transparent cover embodying our invention, showing in broken lines the positions of adjacent boxes mounted on a wall or other support at opposite sides of the box shown in solid lines. In this figure of the drawings, the boxes are horizontally disposed, but in practice they customarily are mounted longitudinally vertically.

Figure 1:
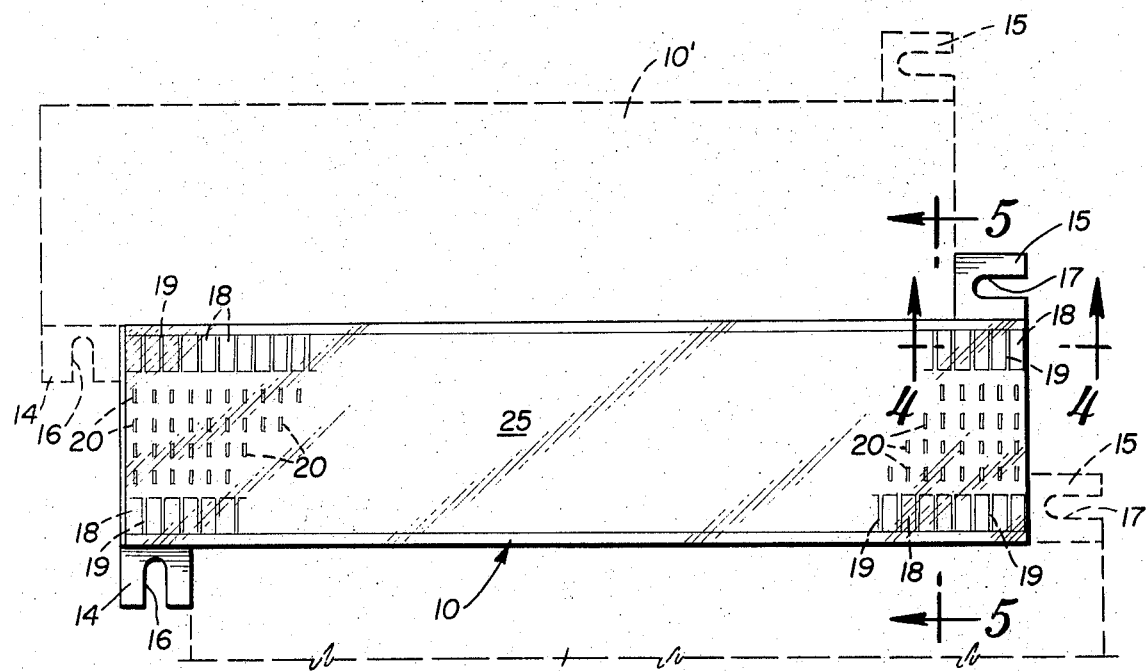
Figure 2:
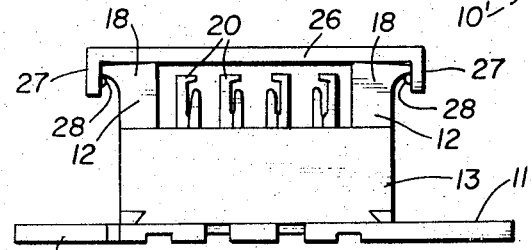
FIG. 2 is an elevational end view of the covered terminal box of FIG. 1.

In the embodiment of the invention shown in FIGS. 1–5, the cover constructed according to our invention is designed for mounting on a conventional terminal box designated 10 as a whole, comprising a generally rectangular base 11, longitudinal side walls 12, end walls 13, and mounting brackets 14 and 15. Preferably the terminal box 10 is mounted on a wall or other suitable support in longitudinally vertical position with its base 11 contacting and parallel to the wall, and the mounting bracket 14 adjacent the upper end of the box. The open end slot 16 in the bracket 14 is designed to receive a fastening device, such as a screw, and the open end slot 17 in the lower bracket 15 serves the same purpose conveniently, for mounting the terminal box on a wall. By staggering the boxes, as shown by the solid line box 10 and adjacent broken line boxes 10', a plurality of such terminal boxes can be mounted side by side with very little space between the side walls 12 of adjacent boxes. The side walls are solid in the area adjacent the base 11 and merge into transversely thickened flat top members 18 spaced apart by parallel transversely extending spaces 19. Connectors 20 are mounted on the base 11 in rows of four, each row extending across the box 10 between two oppositely located side wall members 18.

Figure 3:
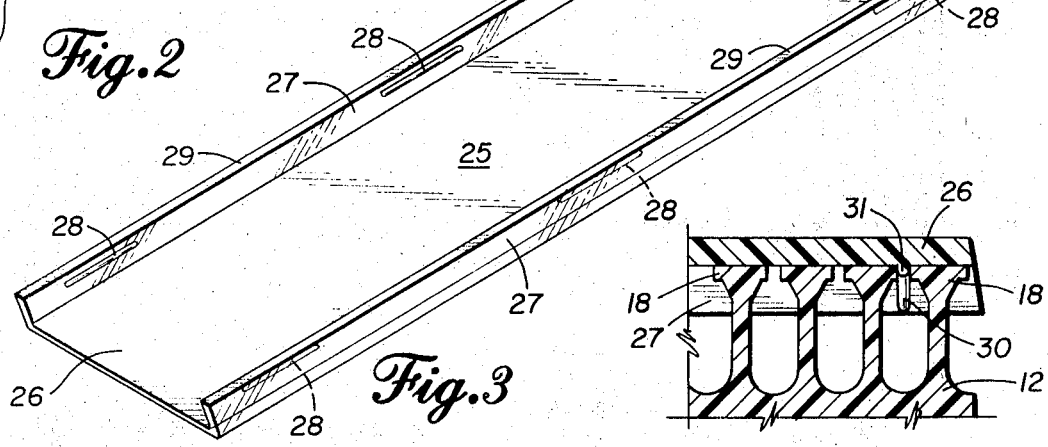
FIG. 3 is a perspective view of the terminal box cover of FIG. 1 as it appears when the cover has been removed from the box and inverted.
Figure 4:
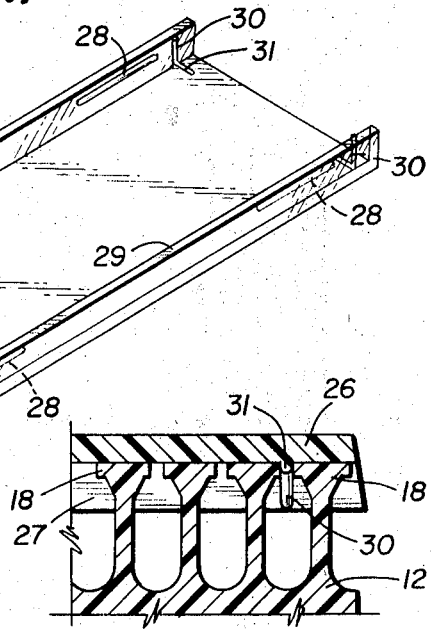
FIG. 4 is a horizontal sectional view in the plane of the line 4—4 of FIG. 1, on an enlarged scale.
Figure 5:
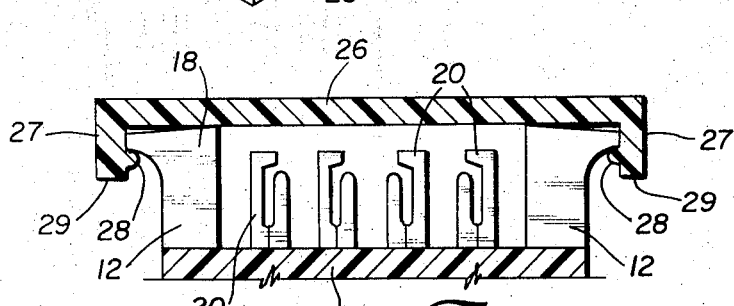
FIG. 5 is a transverse sectional view in the plane of the line 5—5 of FIG. 1, on an enlarged scale.

The cover embodying the invention, designated 25 as a whole, is shown in inverted position in FIG. 3. It comprises a flat top 26 substantially equal in length to the box 10, provided with integral short side walls 27 having ribs 28 located near the free edge 29 of each side wall 27 in position to snap under the thickened members 18 of the side walls 12 of the box 10, as shown in the sectional view, FIG. 5. Adjacent one end of the cover 25, each side wall 27 has an inwardly directed rib 30 which joins a rib 31 on the inner surface of the cover top 26. The ribs or tongues 30, 31 serve to enter spaces 19 between side members 18 at opposite sides of the terminal box 10 as shown in FIG. 4 for the purpose of preventing sliding movement of the cover 25 longitudinally on the box 10. The ribs 28 on the depending side walls 27 of the cover 25 engage the side wall members 18 as shown in FIG. 5 when the cover is snapped down on the terminal box, with the cover top 26 bearing on the flat tops of the side wall members 18.

The flat top surfaces of the side wall members 18 are used to receive pencil or other markings identifying the connectors 20 of a corresponding row or for receiving other indicia. Such markings are visible through the transparent cover 25 of this invention.

Referring to FIGS. 6–9, the terminal box 40 is similar to the box 10 of FIGS. 1–5, including the base 11, side walls 12 with side members 18 and connectors 20. The means for mounting the terminal box 40 on a wall or other support differ from the brackets 14, 15, heretofore described in connection with box 10. The box 40 has base extensions 41 at each end, with openings 42 for reception of bolts or screws or other fastening means. The location of the fastening means of the box 40 is such that another box, designated 40' in FIG. 6, in broken lines, can be mounted closely adjacent the box 40. Only enough space for reception of the side walls of the cover 45 and for manipulation of the cover for removal is required between the adjacent boxes.

Figure 6:
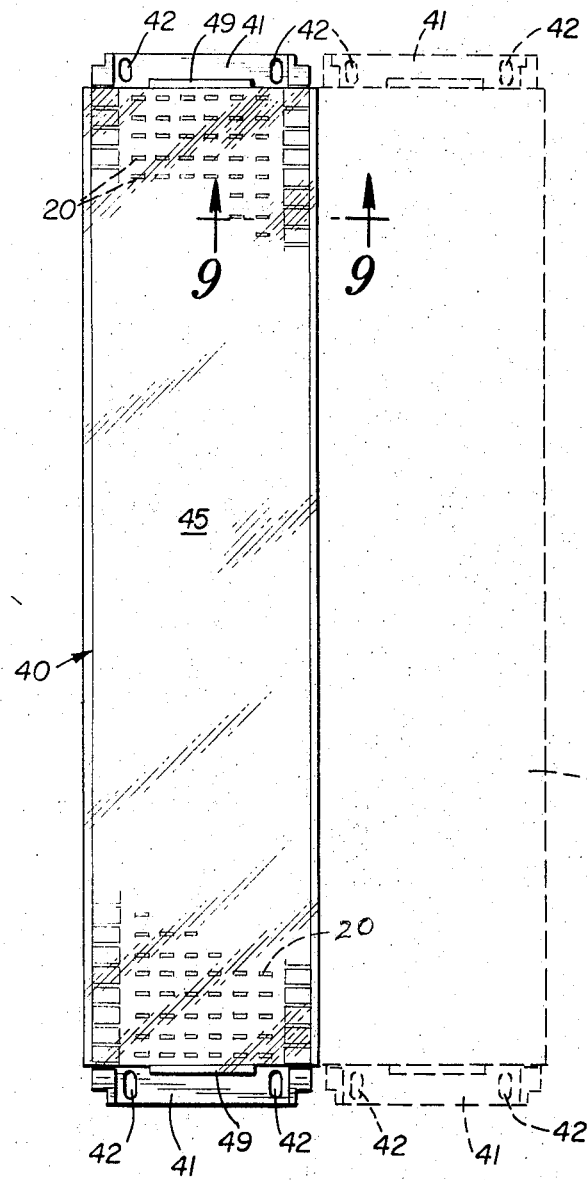
FIG. 6 is a front view of a terminal box covered by a transparent cover embodying a modification of our invention, showing in broken lines an adjacent terminal box mounted on a wall or other support.
Figure 8:
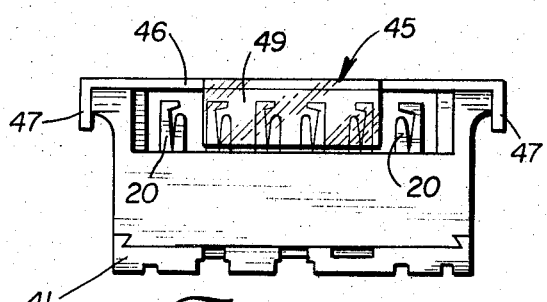
FIG. 8 is an elevational end view on an enlarged scale of the covered terminal box of FIG. 6.
Figure 9:
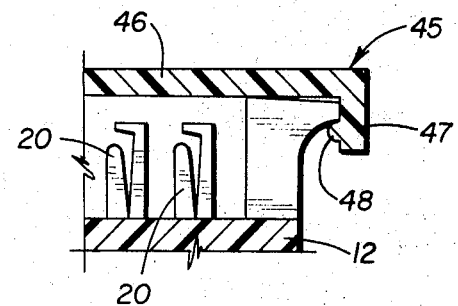
FIG. 9 is a transverse sectional view in the plane of the line 9—9 of FIG. 6, on an enlarged scale.
Figure 7:
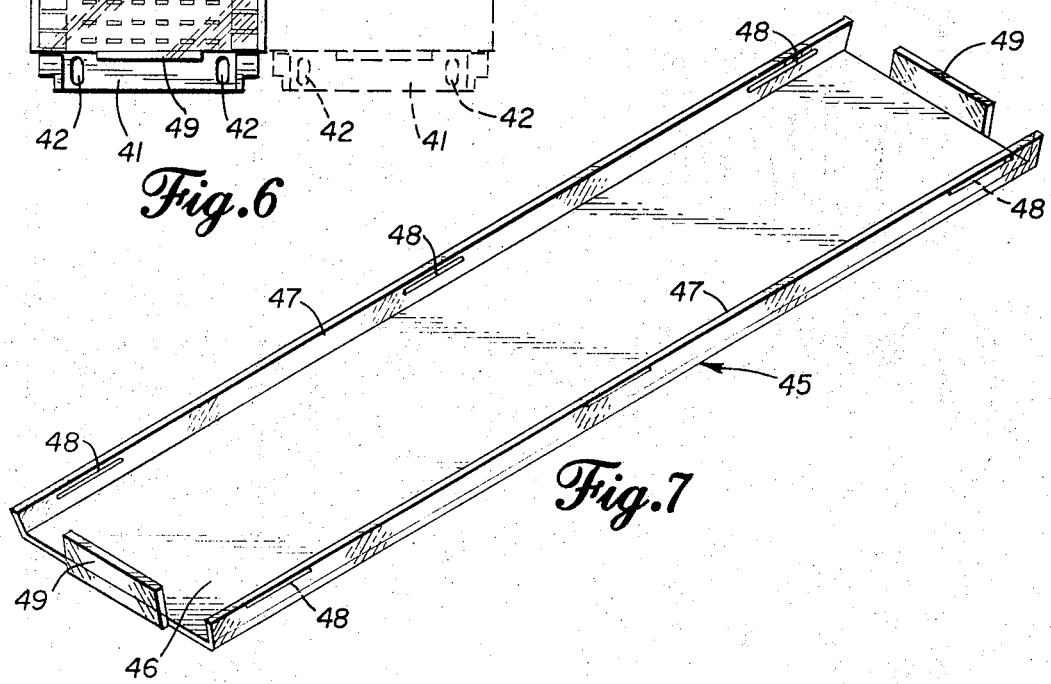
FIG. 7 is a perspective view of the modified cover of FIG. 6, removed from the terminal box and inverted.

The cover embodying a modification of our invention is designated 45 in FIG. 7. It comprises a flat top 46 and integral side walls 47 provided with ribs 48 similar to the ribs 28 on the side walls 27 of the cover 25 heretofore described. The cover 45 differs from the cover 25 in that the former has end projections 49 at right angles to and integral with the top 46. The end projections 49 serve two purposes: the upper one, as shown in FIG. 6, protects the connectors 20 of the terminal box 40 by preventing foreign matter, such as bits of wire, from failling into the terminal box between the cover 45 and the base of the box and causing short circuits, and said extensions 49 prevent relative sliding motion between the cover and box.

We claim:

1. In combination with an open face terminal box for telephone installation equipment and the like having longitudinal parallel side walls provided with outwardly extending members adjacent the open face of the box, a transparent plastic cover comprising
    a. a flat top contacting said outwardly extending members of the box side walls,
    b. cover side walls integral with the cover top provided with inwardly projecting means engaging said outwardly extending members of the box side walls when the cover is pressed down on the said members, and
    c. means on the cover preventing longitudinal sliding movement of the cover relatively to the terminal box, said means on the cover consisting of end extensions on the cover top at right angles to said top for partially closing the ends of the terminal box.

2. In combination with an open face terminal box for telephone installation equipment and the like having longitudinal parallel side walls provided with outwardly extending members adjacent the open face of the box, a transparent plastic cover comprising
    a. a flat top contacting said outwardly extending members of the box side walls,
    b. cover side walls integral with the cover top provided with inwardly projecting means engaging said outwardly extending members of the box side walls when the cover is pressed down on the said members, and
    c. means on the cover preventing longitudinal sliding movement of the cover relatively to the terminal box, said means on the cover consisting of a transverse rib on the inner surface of the cover top extending onto the inner surface of the side wall of the cover for engaging said outwardly extending members of the box side walls.

3. In combination with an open face terminal box for telephone installation equipment and the like having longitudinal parallel side walls provided with outwardly extending spaced apart members having flat upper surfaces adjacent the open face of the box, a transparent plastic cover comprising
    a. a flat top contacting said flat upper surfaces of the outwardly extending spaced apart members of the box side walls,
    b. cover side walls integral with the cover top provided with inwardly projecting longitudinally aligned ribs on said side walls between the free edges of said cover side walls and the cover top engaging said outwardly extending members of the box side walls when the cover is pressed down on said members, and
    c. means on the cover preventing longitudinal sliding movement of the cover relatively to the terminal box, said means on the cover consisting of end extensions on the cover top at right angles to said top for partially closing the ends of the terminal box.

4. In combination with an open face terminal box for telephone installation equipment and the like having longitudinal parallel side walls provided with outwardly extending spaced apart members having flat upper surfaces adjacnet the open face of the box, a transparent plastic cover comprising
    a. a flat top contacting said flat upper surfaces of the outwardly extending spaced apart members of the box side walls,
    b. cover side walls integral with the cover top provided with inwardly projecting longitudinally aligned ribs on said side walls between the free edges of said cover side walls and the cover top engaging said outwardly extending members of the box side walls when the cover is pressed down on said members, and
    c. means on the cover preventing longitudinal sliding movement of the cover relatively to the terminal box, said means on the cover consisting of a transverse rib on the inner surface of the cover top extending onto the inner surface of the side wall of the cover for entering a space between adjacent outwardly extending members of the box side walls.

* * * * *